United States Patent [19]
Filiberti

[11] Patent Number: 5,944,162
[45] Date of Patent: *Aug. 31, 1999

[54] COIN HOPPER MEASUREMENT AND CONTROL SYSTEM

[75] Inventor: Peter L. Filiberti, Las Vegas, Nev.

[73] Assignee: Spinteknology, Inc., Las Vegas, Nev.

[ * ] Notice: This patent is subject to a terminal disclaimer.

[21] Appl. No.: 08/820,873

[22] Filed: Mar. 20, 1997

Related U.S. Application Data

[63] Continuation-in-part of application No. 08/586,513, Jan. 16, 1996, Pat. No. 5,819,901, which is a continuation-in-part of application No. 08/414,238, Mar. 31, 1995
[60] Provisional application No. 60/005,312, Oct. 16, 1995.

[51] Int. Cl.⁶ .................................................. G01G 19/42
[52] U.S. Cl. ........................................ 194/204; 177/25.17
[58] Field of Search ...................... 194/200, 202, 194/216, 217, 218, 339, 350, 204; 177/25.17, 200; 273/143 R; 340/825.32

[56] References Cited

U.S. PATENT DOCUMENTS

| | | |
|---|---|---|
| 3,789,202 | 1/1974 | Yamanaka . |
| 4,219,089 | 8/1980 | Gard et al. .............................. 177/165 |
| 4,238,127 | 12/1980 | Lucero et al. . |
| 4,283,709 | 8/1981 | Lucero et al. . |
| 4,382,527 | 5/1983 | Lerner ...................................... 222/56 |
| 4,447,885 | 5/1984 | Biss ...................................... 177/25 X |
| 4,512,428 | 4/1985 | Bullivant ................................. 177/25 |
| 4,522,275 | 6/1985 | Anderson ................................. 177/25 |
| 4,646,767 | 3/1987 | Hikita . |
| 4,795,155 | 1/1989 | Grande . |
| 5,046,989 | 9/1991 | Dass ...................................... 453/17 |
| 5,056,643 | 10/1991 | Kirberg .................................. 194/202 |
| 5,123,494 | 6/1992 | Schneider ................................. 177/50 |
| 5,193,629 | 3/1993 | Lare ..................................... 177/25.17 |
| 5,199,517 | 4/1993 | Kirby ................................... 177/25.17 |
| 5,429,361 | 7/1995 | Raven et al. . |
| 5,477,952 | 12/1995 | Castellano et al. ..................... 194/200 |
| 5,531,309 | 7/1996 | Kloss et al. ............................. 194/202 |

OTHER PUBLICATIONS

"Tridyne Process Systems, Model 1650," product literature, 2 pp.
"Tridyne Process Systems, Model F–108," product literature, 2 pp.
"Tridyne Process Systems, Model DF–98–SH" product literature, 2 pp.
"Tridyne Process Systems, Model 600" product literature, 2 pp.
"Tridyne Process Systems, Model 2000 or 200" product literature, 1 pp.
"Tridyne Process Systems," product literature, product applications, customer list 3 pp.
W.W. Grainger, Inc. Catalog, p. 893.
"Intelligent DPM Provides PC Software," *Electronic Products*, Jan. 1986, p. 112.

(List continued on next page.)

*Primary Examiner*—F. J. Bartuska
*Attorney, Agent, or Firm*—Philip H. Albert; Townsend and Townsend and Crew

[57] ABSTRACT

The present invention provides a weighing apparatus for weighing coins accumulated in a coin hopper using a load cell and automatically taking a periodic readings of the number of coins accumulated in the hopper. By periodically monitoring the hopper and automatically calculating the number of coins in the hopper, theft of coins and other irregularities can be easily and timely detected. The unauthorized removal of coins during an actual or purported maintenance procedure can be detected by automatically determining a count of coins before a hopper access door is opened, automatically counting the number of coins once the door is closed, and using those two counts to determine the change in the number of coins in the hopper at the time of the change. In a preferred embodiment, the identity of the person opening the hopper door and the time in which the hopper door is opened and closed are recorded, along with any detected discrepancy between the change in coin count and an expected change, if any, in coin count.

7 Claims, 8 Drawing Sheets

OTHER PUBLICATIONS

"Acquisition Module Links to Serial Port," *Electronic Products,* Jan. 1986, p. 113.

"Digital Transmitters and Data Acquisition Sofware—D1000 and D2000 Omegabus® System," product literature, p. c–41.

"Little G™: The Smart Controller!," *Electronic Products,* Feb. 1996, p. 146.

*Magnum Opus—Custom Electronic Engineering* Catalog, (EEM 1996), pp. 7, 2025 W.W. Grainger, Inc. Catalog (#378), p. 895.

*Thomas Register 1995,* pp. SCA/27964–27945.

*Packaging Machinery Directory 1994–1995,* pp. 290–291, 293–294.

"Triangle Selectacom 360/18—The Jumbo Masters of Big Piece, Large Volume Weighing," product literature, 8 pp.

"Triangle Selectacom 360/14 Computer Combination Scale—The Racing Radial." product literature, 6 pp.

"Triangle Selectacom 360/10 of Big–Piece to Flowable Large Volume fast Weighing—The Jumbo Masters," products literature, 4 pp.

"Triangle Selectacom SPD The Rapid Transit in Computer Weighing," product literature, 6 pp.

"Triangle Acceleron—The Freedom Machines of Form–Fill–Seal," product literature, 6 pp.

"Traingle Acceleron Advantage—Easily the simplest VFFS to run, service, clean ad changeover," product literature, 8 pp.

"Tridyne Process Systems," product literature, 5 pp.

"Tridyne Process Systems, Model F–98" product literature, 2 pp.

"Tridyne Process Systems, Model F–98–6000" product literature, 2 pp.

COIN HOPPER MEASUREMENT AND CONTROL SYSTEM

CROSS REFERENCE TO RELATED APPLICATIONS

This application is a continuation-in-part of application Ser. No. 08/586,513, filed Jan. 16, 1996 now U.S. Pat. No. 5,819,901 which is a continuation-in-part of application Ser. No. 08/414,238, filed Mar. 31, 1995, which is incorporated herein by reference for all purposes. Applicant also claims priority from the U.S. Provisional Patent application entitled "Coin Hopper Measurement and Control System" (application Ser. No. 60/005,312) filed Oct. 16, 1995. That application is incorporated herein by reference for all purposes.

A U.S. patent application entitled "KEJO Coin Hopper" (application Ser. No. 08/444,560) filed May 19, 1995 now abandoned and a provisional patent application entitled "Improved Coin Hopper" (application Ser. No. 60/005,298) filed Oct. 16, 1995 are incorporated herein by reference for all purposes.

COPYRIGHT NOTICE

A portion of the disclosure of this patent document contains material which is subject to copyright protection. The copyright owner has no objection to the xerographic reproduction by anyone of the patent document or the patent disclosure in exactly the form it appears in the Patent and Trademark Office patent file or records, but otherwise reserves all copyright rights whatsoever.

TECHNICAL FIELD OF THE INVENTION

The present invention relates to hoppers used to collect and distribute coins in gaming and vending machines. More particularly, the present invention relates to a coin hopper which is reliable, effectively tamperproof and easily assembled.

BACKGROUND OF THE INVENTION

The present invention relates to the field of coin or disk handling. More specifically, in one embodiment the invention provides an improved method and apparatus for controlling coin and disk accounting in slot machines and other gaming machines.

Because casinos deal with large amounts of cash, they are subject to theft by dishonest persons and are particularly vulnerable to theft by dishonest employees. If so inclined, a dishonest technician can take a few coins from each casino slot machine as it is serviced. Although the take over time and over many technicians can be quite large, since each individual take is so small, casinos have resigned themselves to being shorted and treat the thefts as a cost of doing business. Casinos have tried to combat this problem by assigning two or more technicians to each task requiring an open gaming machine. However, this leads to additional labor costs and doesn't help if each of the assigned technicians is dishonest.

An alternate solution is to seal the coin or bill reservoir so that only trusted money-handling employees working in a cashier's cage can get to the coins or bills. Coin acceptors are more difficult to seal than bill acceptors because coin acceptors have to give out coins as well as receive them, whereas bill acceptors simply store the bills, and because coins are more likely to jam a hopper than pliable bills. If jamming was not a concern, then the hoppers could be sealed. However, where jamming is a possibility, sealing the hoppers might result in greater down-time for the gaming machines, which is a loss to the casinos which can be greater than the theft loss.

The co-filed provisional patent application (application Ser. No. 60/005,298 referred to above describes an improved hopper which is much less likely to jam than prior art hoppers. However, even with a jam-free hopper, the hopper must be occasionally opened to refill with coins after a jackpot is hit and thus is not readily amenable to being sealed. Even if the hopper were sealed, it would not prevent a coin loader from removing some coins from the load of coins being added to the hopper.

As should be apparent after reading the above, merely counting coins as they go into the hopper and counting coins as they leave the hopper would not prevent theft, as a physical inventory would only indicate that coins are missing, not who took them.

Prior art systems exist for weighing coins to count the coins, and many such devices might be used in a money room of a casino. For example, U.S. Pat. No. 5,193,629 issued to Lare and U.S. Pat. No. 4,512,428 issued to Bullivant describe apparatus for weighing coins. While such weighing devices might be suitable for weighing coins in a money room, it is unsuitable in a gaming machine environment, where the hoppers must be enclosed to prevent theft by players, as well as being remotely accessible, operable in an electrically noisy and vibration-prone environment and able to detect theft at the time of the theft.

From the above it is seen that an improved method and apparatus for coin accounting and theft prevention is needed.

SUMMARY OF THE INVENTION

The present invention provides a weighing apparatus for weighing coins accumulated in a coin hopper using a load cell and automatically taking a periodic readings of the number of coins accumulated in the hopper. By periodically monitoring the hopper and automatically calculating the number of coins in the hopper, theft of coins and other irregularities can be easily and timely detected. The unauthorized removal of coins during an actual or purported maintenance procedure can be detected by automatically determining a count of coins before a hopper access door is opened, automatically counting the number of coins once the door is closed, and using those two counts to determine the change in the number of coins in the hopper at the time of the change. In a preferred embodiment, the identity of the person opening the hopper door and the time in which the hopper door is opened and closed are recorded, along with any detected discrepancy between the change in coin count and an expected change, if any, in coin count. An expected change, for example, would exist when a technician is asked to open the machine and remove coins (which are later counted). The number of coins in the hopper at any given time is determined from the combined weight of the hopper and the coins accumulated in the hopper. During a calibration process, a tare (zero) weight of the hopper is determined, and an operator is given the opportunity to have a per coin weight determined automatically by placing a known quantity of coins in the hopper and measuring the combined weight and the known quantity of coins. Knowing the tare weight of the hopper and the per coin weight, the number of coins accumulated in a hopper can be calculated from the combined weight of the hopper with the coins accumulated therein.

A further understanding of the nature and advantages of the inventions herein may be realized by reference to the remaining portions of the specification and the attached drawings.

DESCRIPTION OF THE PREFERRED EMBODIMENTS

Figure 1:
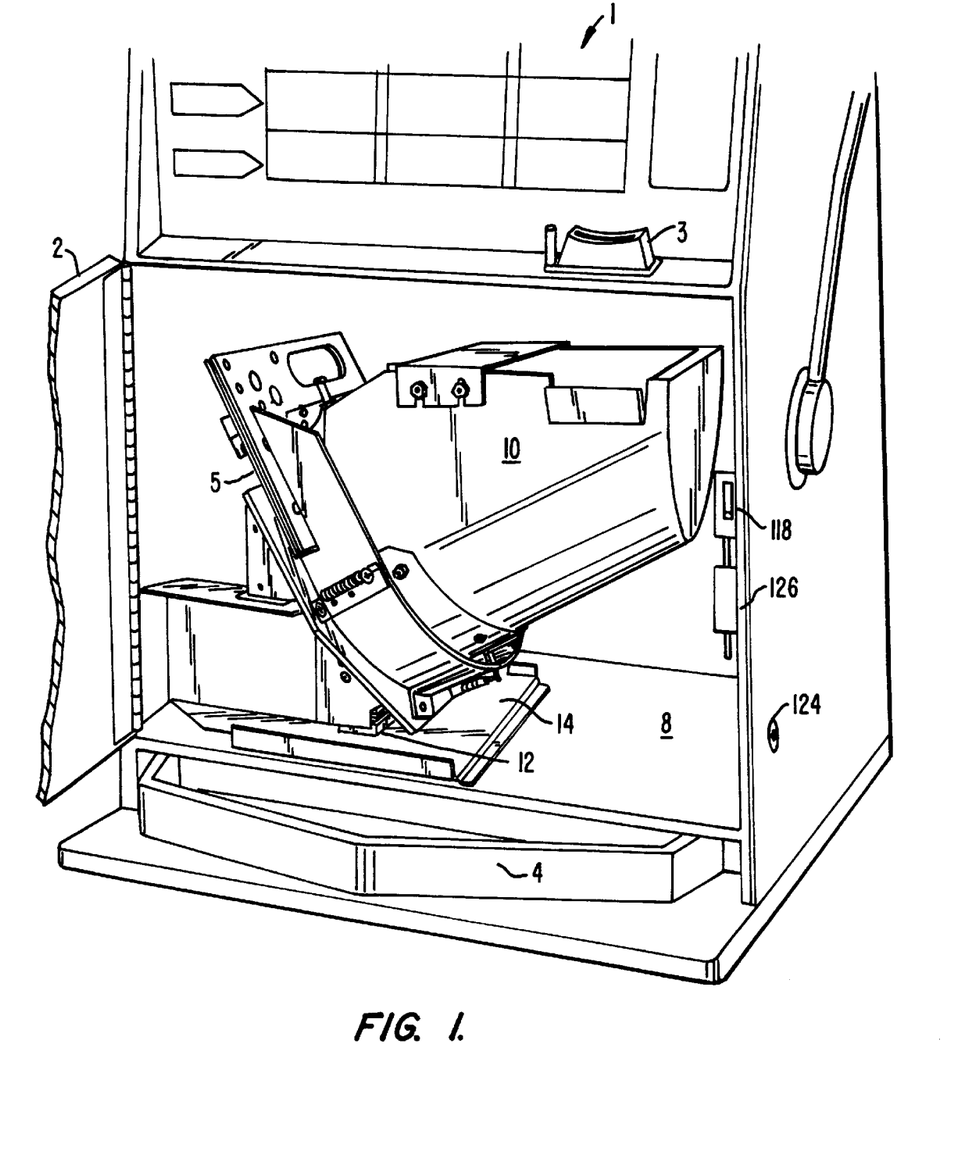
FIG. 1 is a front view of a slot machine with its door open showing a coin hopper.

FIG. 1 illustrates how a coin hopper 10 is often mounted in a slot machine 1. To show the placement of the hopper, a hopper door 2 of slot machine 1 has been opened. During operation, the hopper door 2 would usually be locked shut to prevent theft of coins by players. As shown here, hopper 10 is often placed below a coin insertion slot 3 and above a coin payout tray 4. To initiate play of a game, a player would insert one or more coins into coin insertion slot 3 and those coins would drop into hopper 10. Although not shown in FIG. 1, the coins would typically pass through a coin handling unit on their way to hopper 10, where the coin handling unit performs tests (size, weight, angular moment, etc.) to determine if the coin is real and of the proper denomination. The coin handling unit, or other device, would provide a signal, such as an electric "coin in" pulse, to a logic board to signal that a valid coin has been inserted. If a game is a winning game, or the player cashes out his or her credits with slot machine 1, hopper 10 ejects the correct amount of coins from ejection slot 5 into payout tray 4. In some embodiments, such as so-called "slant-top" slot machines, the hopper is actually located below the payout tray and an "elevator" or "escalator" mechanism is used to raise the paid out coins higher than the payout tray so that the coins will fall into the payout tray, and thus be accessible to the player.

Typically, a motorized conveyor assembly (not shown) of hopper 10 causes coins to be ejected to the payout tray or elevator and that conveyor assembly runs until a "coin out" counter signals that the correct number of coins have been ejected. Thus, thefts can be detected by taking an initial manual inventory of the coins in hopper 10, then tracking the "coin in" and "coin out" pulses and taking a closing inventory. However, this process requires two manual inventory steps, does not detect who took the missing coins or when, and doesn't account for coins which are misfed into or out of hopper 10 and fall into other areas inside slot machine 1, such as area 8. To solve these problems, an electronic weight sensor, specifically a load cell 12, is provided as shown in FIG. 2.

Figure 2:
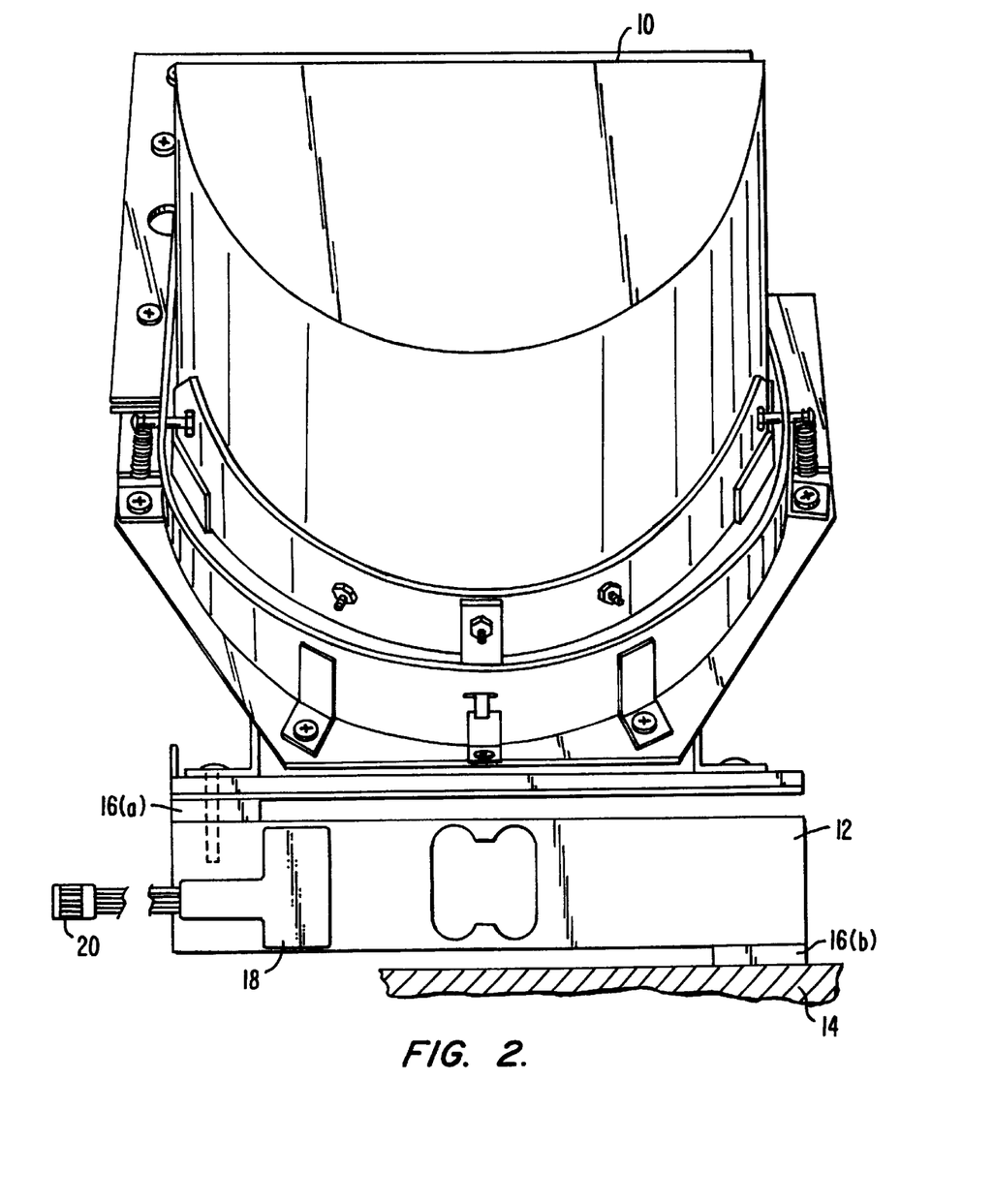
FIG. 2 is a more detailed side view of the coin hopper shown in FIG. 1 illustrating the cantilevered mounting of the hopper on the load cell

FIG. 2 illustrates the mounting of hopper 10 onto a base 14 of slot machine 1 using load cell 12 and cantilever spacers 16. Hopper 10 and the coins therein are totally supported by cantilever spacer 16(a), which is in turn totally supported by load cell 12, which is turn totally supported by cantilever spacer 16(b) mounted directly to base 14. Thus, the weight of the hopper and the coins therein is applied to load cell 12 causing a strain on load cell 12 which is a function of the weight of the hopper and coins therein. That strain is measured by a strain gauge 18 and the strain can be measured by reading electrical signals on the lines of cabling 20. In a preferred embodiment, load cell 12 is a 36 kilogram load cell sold by HBM, Inc. of Connecticut with a sensor attached thereto manufactured by Cirrus Logic. For larger hoppers, a 72-kilogram load cell sold by HBM, Inc. can be used. Of course, any suitable load cell can be used.

Figure 3:
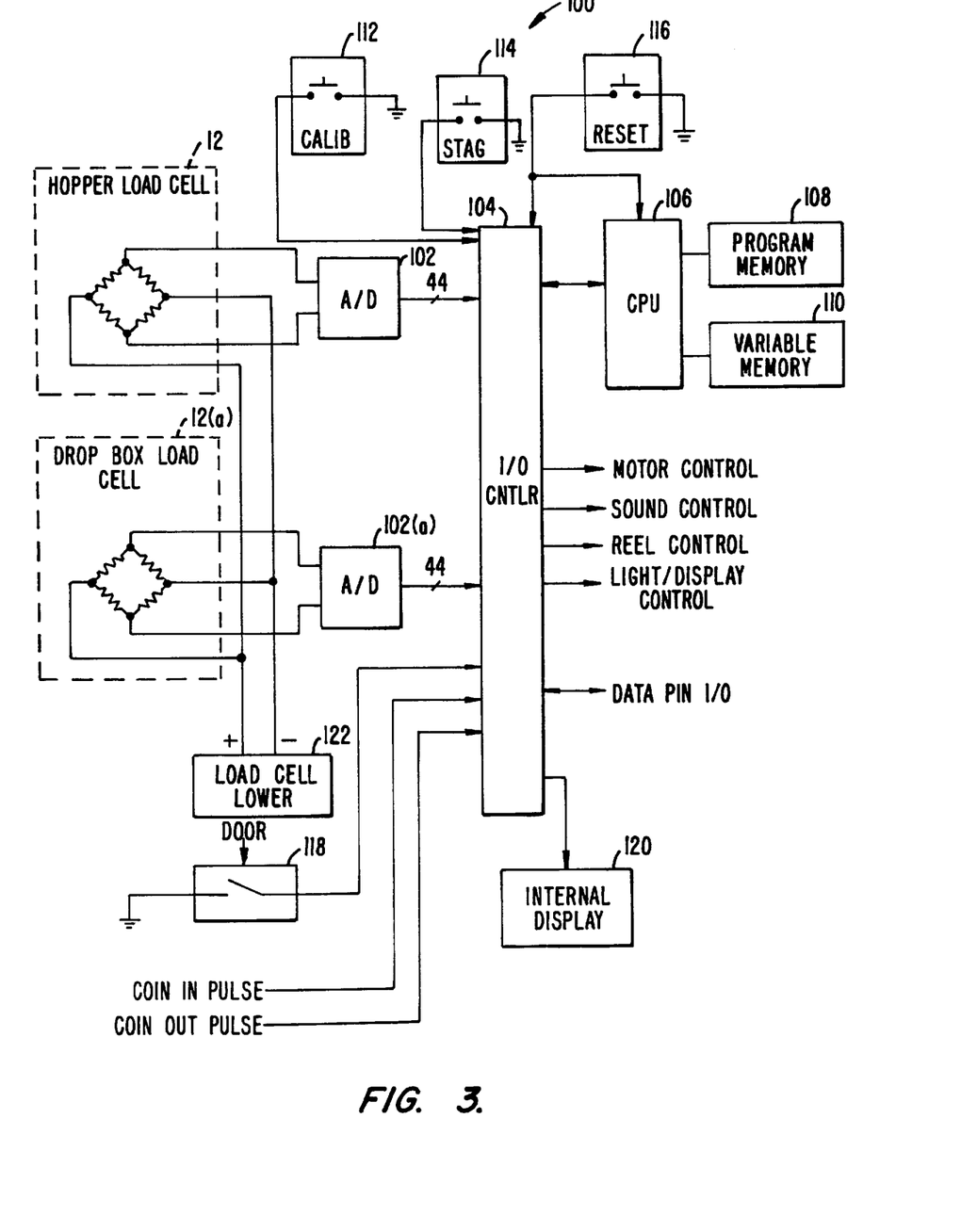
FIG. 3 is a schematic diagram of the electronics of the coin hopper and accounting system shown in FIG. 2.

Referring now to FIG. 3, a schematic of a logic board 100 used in a preferred embodiment of the present invention is shown. In an alternative embodiment, the role of the logic board is subsumed into a central slot machine control system. The logic board comprises an analog-to-digital converter (ADC) 102 coupled to load cell 12 to convert a load signal from an analog signal to a digital load cell sample. As shown, the digital load cell sample has a resolution of 14 bits (hence the 14 signal lines carrying the signal in parallel), but other resolution A/D converters can also be used. With 14 bits, an integer corresponding to the digital load cell sample can range from 0 to 16,383. With proper calibration and proper selection of load cell 12, a fully loaded hopper will cause a reading near the top end of the range, so as to have the best resolution.

ADC 102 provides its output to an input-output (I/O) controller 104 which in turn provides samples, as requested, to a central processing unit (CPU) 106. CPU 106 executes programs stored in program memory 108 and uses a variable memory 110 to store data incident to the execution of those programs. The programs executed by CPU 106 comprise instructions for following the processes described in FIGS. 4–8, however CPU 106 might also execute other programs not described herein. In some embodiments, a CPU with built-in I/O control functions and/or memory might be used, however the description of FIG. 3 still applies to such integrated systems.

FIG. 3 shows a number of I/O signals being provided to, or by, I/O controller 104. For example, "Coin In" and "Coin Out" signals are provided from coin handling devices. These signals can be pulses (one pulse per coin) or can be other signals indicating a count, as are well known in the art. I/O controller 104 might also provide motor, sound, reel, lights and display control signals, if CPU 106 or I/O controller 104 are programmed to handle such functions of slot machine 1. I/O controller 104 receives switch signals from a variety of sources, of which a calibration switch 112, a start switch 114, a reset switch 116 and a door switch 118 are shown. FIG. 3 also shows an internal display 120 which is used as explained below.

Also shown in FIG. 3 is a drop box load cell 12(a) and an ADC 102(a) coupled to I/O controller 104. Drop box load cell 12(a) performs a function similar to load cell 12, in that it provides an indication of the weight of a drop box (not shown) and the coins therein. A drop box is a standard part of some slot machines, and is used to contain the overflow of coins from a hopper. For example, in FIG. 1, a drop box might have been installed below hopper 10. A drop box is similar to a hopper, in that it holds a collection of coins, but differs from a hopper in that coins are not ejected from the drop box. If a drop box is used, a hopper may have a sensor which detects when the hopper is full (or could use the present invention to determine if more than a threshold number of coins are in the hopper), and ejects coins in such as way that the ejected coins fall into the drop box instead of into payout tray 4. Of course, load cell 12(*a*) and ADC 102(*a*) are not needed where coin accounting for drop box coins is done separately or the drop box is not used.

I/O controller 104 also reads/writes data from a data pin 124 (see FIG. 1) as explained below. In a preferred embodiment, data pin 124 is part of a communication system manufactured by Dallas Semiconductor. A data wand (not shown) is a hand-held, battery-powered device with an internal computer which communicates with I/O controller 104 through a single signal line and chassis ground connection.

In operation, load cells 12, 12(*a*) are provided with load cell power from a load cell power source 122 and generate an analog voltage which is a function of their load, which analog voltage is input to the load cell's ADC 102 or 102(*a*). In operation, the states of the various switches shown in FIG. 3 are monitored, as explained in connection with FIG. 4.

Figure 4:
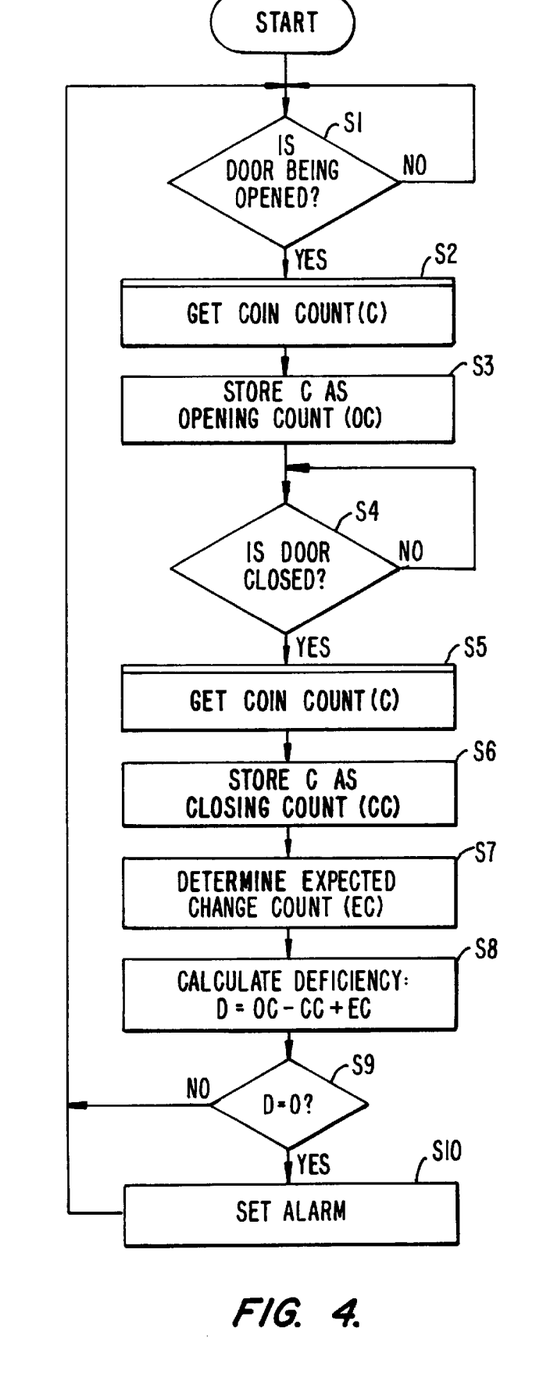
FIG. 4 is a flowchart of an accounting process for accounting for coins in a coin hopper such that theft is timely detected.

FIG. 4 is a flowchart of a process for timely detecting unauthorized coin removal as performed by CPU 106 according to instructions stored in program memory 108. Each step in FIGS. 4–8 is numbered with a step number and the step numbers within each figure follow in sequential order of execution of the steps, except where noted.

The process shown in FIG. 4 begins when hopper door 2 (see FIG. 1) is opened (S1). This process assumes that the primary mode of coin theft is from dishonest technicians or other casino employees opening slot machine door 2 to perform actual or purported maintenance and taking coins from hopper 10 while hopper door 2 is open. Presumably, a game cannot be played and a payout cannot be made while door 2 is open and therefore a coin count should not change except in cases of authorized coin withdrawal. In a preferred embodiment, hopper door 2 is secured by an electronic switch, such as a solenoid 126 (see FIG. 1), which can only be activated by the technician or employee touching their assigned data wand to data pin 124. As part of the opening process, CPU 106 records an employee ID communicated from the data wand before activating solenoid 126 to open hopper door 2. Alternatively, hopper door 2 can be opened by an ordinary key and the door opening can be detected by door switch 118. In either case, a preferred embodiment records the time of opening.

When hopper door 2 is being opened, or preferably just before access is granted or hopper door 2 moves, a coin count is obtained (S2) and the count is stored as the opening count (OC). If CPU 106 makes continuous, periodic readings, then the opening count might just be the most recent periodic reading before hopper door 2 was opened and after the last game was played.

At step S4, the door is monitored until it is closed, and another coin count is taken (S5). In a preferred embodiment, this second coin count is a reading taken after slot machine 1 has stabilized following the closing of the door. This coin count, C, is stored (S6) as the closing count (CC). Next (S7), an expected change count (EC) is determined. This expected change count is positive in the case where a technician is sent to a slot machine to add coins to a depleted hopper, is negative where the technician is sent to the slot machine to remove coins, and is zero where the technician is sent to the slot machine simply to perform maintenance. Of course, other variations of this scheme are also possible. For example, the expected change count might not be known at the time the coins are removed, but later determined after the technician turns over the coins removed from the slot machine.

If the expected change count is known at the time the door is closed, a deficiency can be easily calculated (S8), by subtracting the closing count (CC) from the opening count (OC) and adding the expected change count (EC). If the resulting deficiency (D) is not equal to zero (S9), then an alarm can be set (S10). Where the slot machine does not automatically determine the identification of the technician or other employee opening the slot machine, the setting of an alarm might result in a flashing light on the slot machine being immediately activated, so that the unauthorized removal of coins can be detected by a floor manager while the thief is still present at the machine. However, in a preferred embodiment, the slot machine detects the time of opening and closing as well as the identification of the person opening the machine, thereby allowing the deficiency to be easily traced to a specific employee. In an alternate embodiment, where the slot machine is not able to determine the identity of the person opening the slot machine, the slot machine will merely record the time of entry and the deficiency for later comparison to a log kept elsewhere showing which employees had access to which slot machines at which times. In a preferred embodiment, the alarm is not merely a local alarm in the form of a flashing light on the slot machine or the like, but is an alarm which is recorded by CPU 106 and is communicated to a central security station (not shown). Regardless of whether an alarm is set or not, the flow of the process returns to step S1, where it remains until the hopper door is again opened.

While the process shown in FIG. 4 will detect unauthorized removal of coins when a hopper door 2 is open, it does not necessarily detect unauthorized removal of coins when hopper door 2 is closed. The latter type of unauthorized coin removal is less problematic than the former, since it would require that the dishonest employee or technician modify the slot machine to eject or reroute coins out of the hopper 10 into other spaces inside slot machine 1 for later retrieval. This manner of theft can be counteracted by monitoring the rate at which coins fail to reach hopper 10 or fail to be counted as they are ejected. With centralized monitoring of slot machine activity, the unaccounted for loss of coins while hopper door 2 is closed can be monitored for each slot machine and those slot machines with higher than normal rates of coin loss can be carefully inspected for modifications which increase such coin loss. Coin loss from the hopper to the drop box during normal operation can be accounted for through the use of load cell 12(*a*) and ADC 102(*a*), as described above.

In a preferred embodiment, the slot machine activity is communicated to a central security station for easy monitoring and prompt detection of deficiencies. The automatic coin accounting process of FIG. 4 is a process which can be run independently of the coin counting processes shown elsewhere. The use of the present invention to handle other modes of theft or coin accounting should be apparent after reading this present description.

Figure 5:
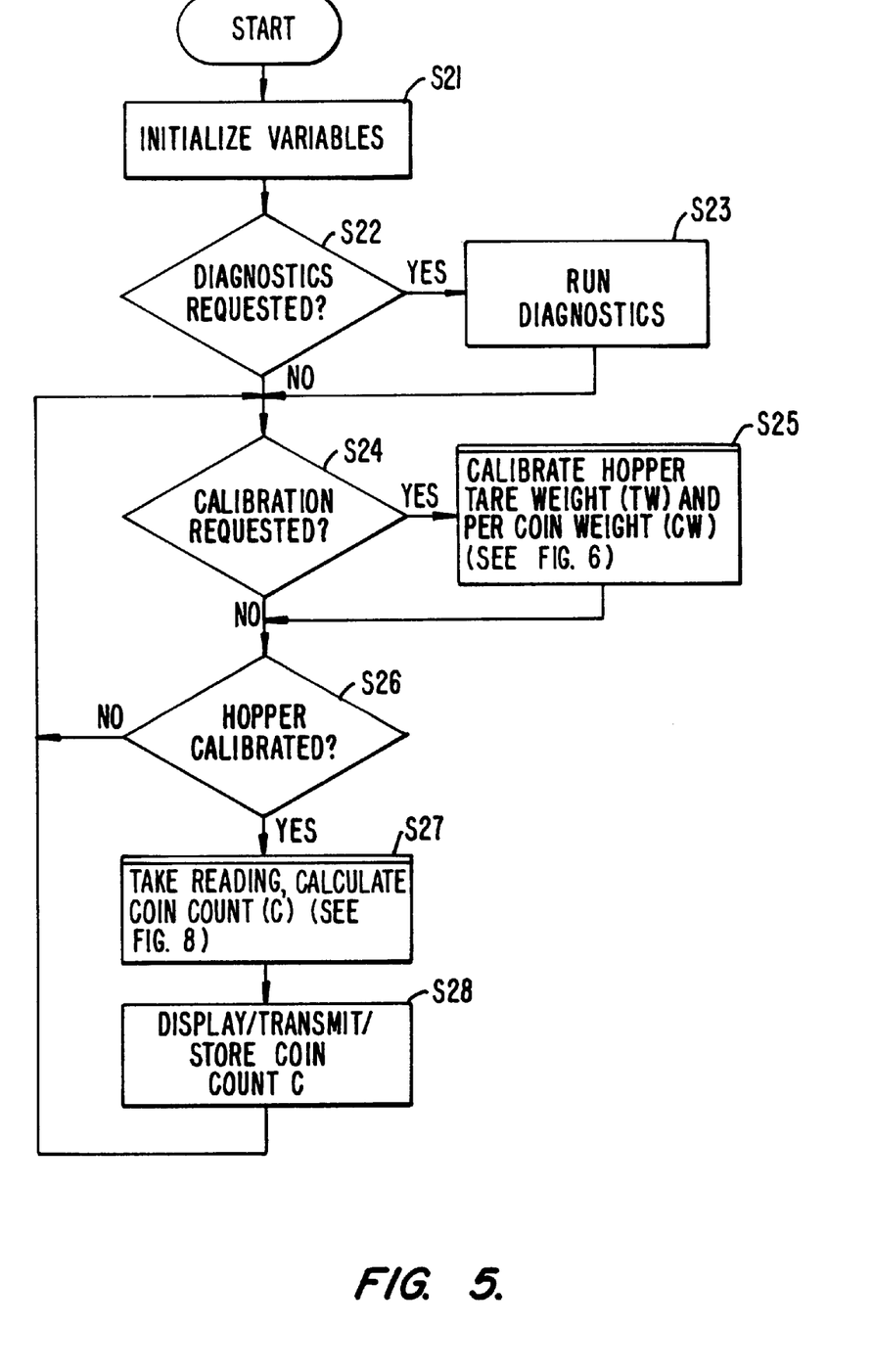
FIG. 5 is a flowchart of a process for automatically taking periodic measurements to determine a coin count of coins in the hopper.

While FIG. 4 shows a process of deficiency detection, FIG. 5 shows a more general process of taking a reading to calculate coin count C. In a preferred embodiment, the processes of FIG. 4 and the processes of FIG. 5 run asynchronously, with the process shown in FIG. 5 being a process of periodically taking a reading to update the current coin count and storing a new coin count whenever it is determined that a stable and reliable reading has been taken, while the process shown in FIG. 4 (more specifically steps S2 and S5) merely refers to the stored coin count value for the latest reliable coin count.

Referring now to FIG. 5, the process shown therein begins with an initialization of the variables used (S21). At this point, the operator is prompted with "START" or a similar prompt, prompting the operator to begin the calibration process. The prompt is displayed, in some embodiments, on a computer terminal, while in other embodiments it is displayed on an LED display 120 coupled to I/O controller 104 (see FIG. 3). Preferably, the operator first determines that the hopper and slot machine are stable and the hopper is empty.

At step S22, CPU 106 (see FIG. 3) determines whether diagnostics were requested by the operator. One embodiment, the operator signals that diagnostics are requested by sending a predetermined signal from a terminal to I/O controller 104 such as through the data pin I/O or by simultaneously pressing calibration button 112 and start button 114 (see FIG. 3). If diagnostics are requested, CPU 106 executes those diagnostics (S23) and proceeds to step S24. Otherwise, if diagnostics are not requested, CPU 106 proceeds directly to step S24.

At step S24, CPU 106 checks to see if the operator has requested a calibration. In the embodiment shown in FIG. 3, the operator requests calibration by pressing calibration button 112. If calibration is requested, the calibration process is executed (S25) to determine a tare weight (TW) and a per coin weight (CW). Following the calibration step, which is described in further detail in FIG. 6, or if calibration is not requested, CPU 106 proceeds to step S26, where it determines whether or not the hopper was calibrated. If the hopper was not calibrated, either because calibration was not requested or because the calibration step was not successful due to unreliable readings, CPU 106 returns to step S24, thus creating a loop that is only exited when the hopper is finally calibrated.

When the loop is exited, CPU 106 proceeds to step S27, where a reading of the hopper weight is taken and a coin count is calculated. This process is shown in further detail in FIG. 8. Once a reliable coin count is obtained (S28), that coin count is displayed, transmitted to a remote storage and/or display device or the coin count is simply stored in variable memory 110 (see FIG. 3), for later provision of a coin count value to other processes which use the coin count. Once the coin count is obtained and processed as described above, CPU 106 returns to step S24. Thus, while the hopper remains calibrated, CPU 106 executes a periodic loop of taking a reading, calculating a coin count, and providing the coin count to various display or memory devices as needed. In a preferred embodiment, a latest reliable value for the coin count is retained and is not overwritten by any subsequent unreliable coin counts, thereby providing a reliable coin count value which can be polled at any time by asynchronous processes.

Figure 6:
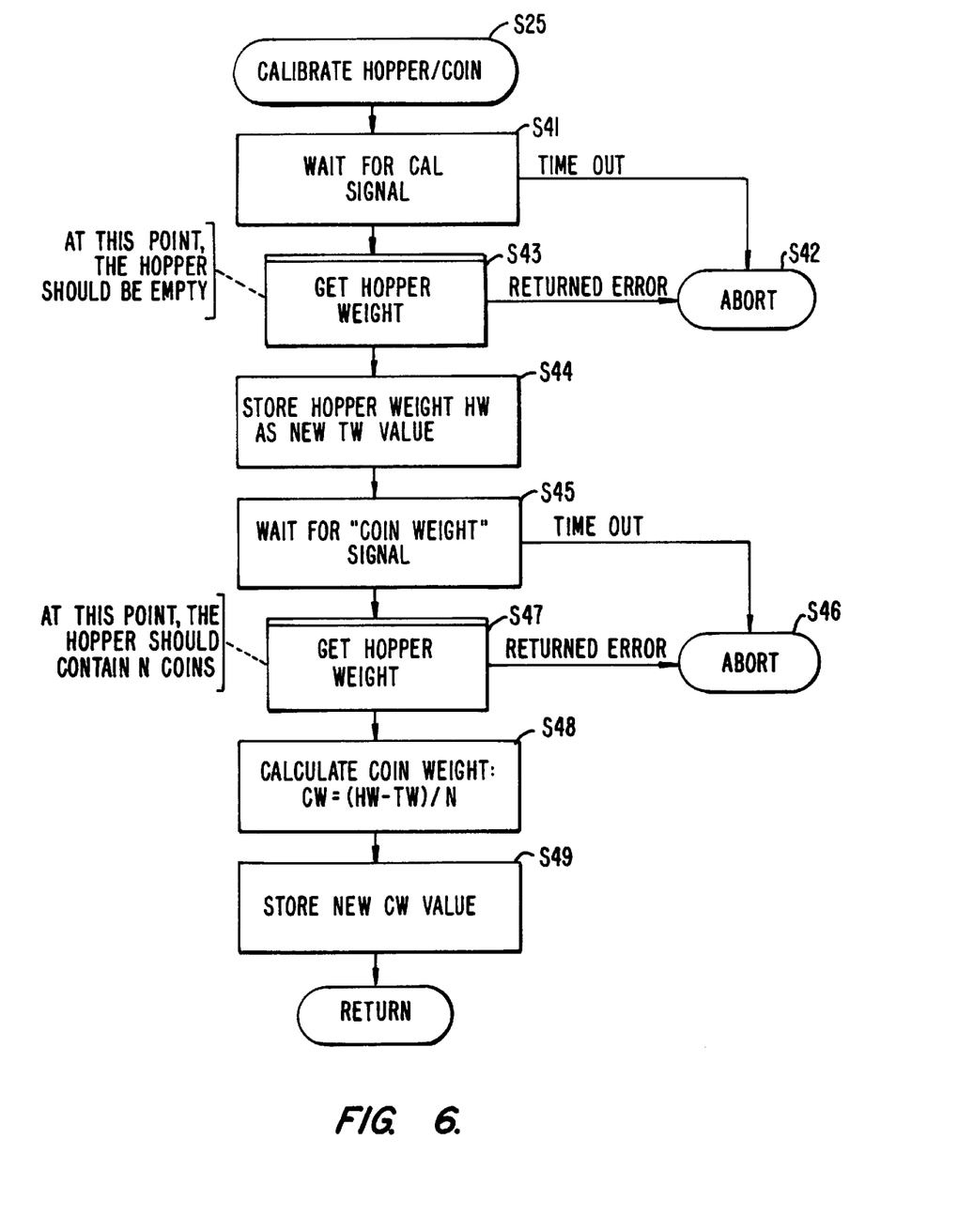
FIG. 6 is a flowchart of a process for calibrating a hopper's tare weight and a per coin weight.

FIG. 6 shows the calibration process of step S25 in further detail. At the outset of the calibration process, CPU 106 waits (S41) for a calibration signal, either from a remote device or from the operator pressing calibration switch 112. If the calibration signal is not received within a predetermined time, the calibration process is aborted and an indication that calibration did not complete is given so that readings (see FIG. 5) will not be taken until the calibration process actually successfully completes. If the calibration signal is received, CPU 106 proceeds to obtain the hopper weight (S42), which is described in further detail in FIG. 7. Prior to receipt of the calibration signal, the hopper should have been emptied by the operator so that a tare weight of the hopper can be obtained. Also, if the calibration signal is sent using calibration switch 112, CPU 106 delays for a predetermined time to allow for dampening of slot machine vibrations due to calibration switch 112 being pressed. If the hopper weighing process returns an error indicating that a reliable hopper weight cannot be obtained, CPU 106 aborts the calibration process (S42). However, if a reliable hopper weight is obtained, that hopper weight is stored as the new tare weight (TW) value for the hopper (S44).

Once the hopper tare weight is obtained, CPU 106 waits for a COIN WEIGHT signal (S45), and when the COIN WEIGHT signal is received, CPU 106 again measures the hopper weight (S47). Before the COIN WEIGHT signal is sent, the process expects that the hopper now contains N coins. In a preferred embodiment, N=20, however it should be apparent that other values of N could be used. If a time out occurs while waiting for the COIN WEIGHT signal or the hopper weighing process returns an error, the calibration process is aborted (S46) and only the tare weight is updated. Where a hopper is modified or moved to a different slot machine, the calibration procedure could be allowed to abort at step S46, without ill effects, since the prior per coin weight can be reused.

Once the hopper weight is obtained (S47) for the hopper and the N coins, a coin weight is calculated (S48) by subtracting the hopper tare weight (TW) from the just measured hopper weight (HW) and dividing the difference by N. This new per coin weight (CW) is then stored (S49) in variable memory 110 and the calibration process returns indicating a successful hopper calibration.

Figure 7:
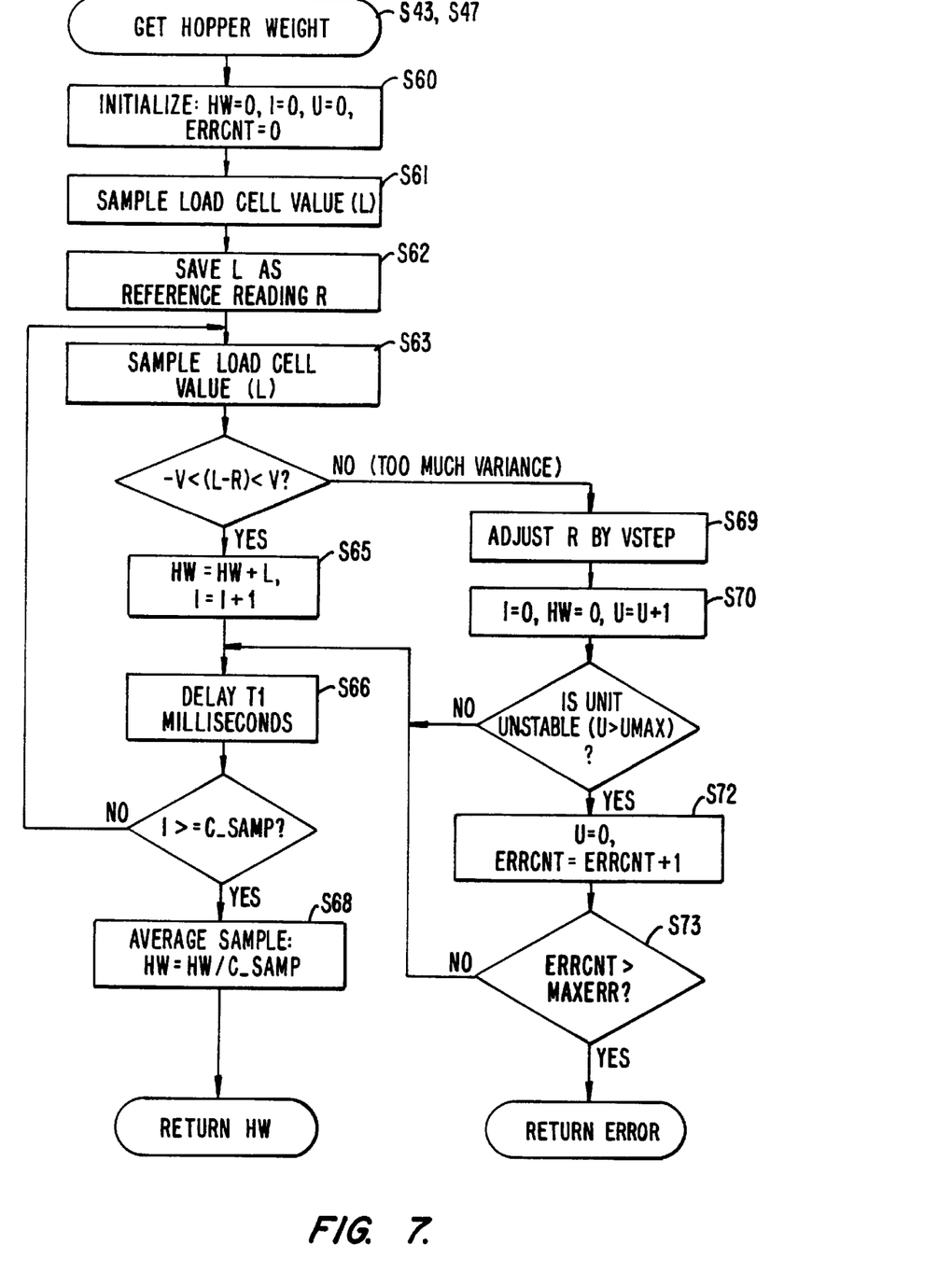
FIG. 7 is a flowchart of a process for obtaining an accurate hopper weight during calibration in the presence of noise and/or vibrations.

FIG. 7 shows the process of getting a hopper weight, the result being either returning successfully with a hopper weight (HW) or returning an error indicating that the hopper was too unstable for a measurement to have been taken.

At the beginning of the process, the variables used for temporary storage and loop control are initialized (S60) and a sampled digital value, L, is taken from load cell 12 (S61). As should be apparent from this description, the processes of FIGS. 4–8 are equally applicable to coin accounting using a drop box, with the main difference being that load cell 12(a) is sampled instead of load cell 12. The sampled value L is stored as a reference reading R (S62), and a main loop is entered.

In the main loop, the load cell is again sampled (S63) to obtain a new value for L. If the absolute value of the difference between L and the reference reading R is less than a variance limit, V, then the sampled value L is added to an accumulator (HW) and a loop counter (I) is incremented (S65). CPU 106 then pauses for a predetermined delay period of T1 ms (S66) and then loops back to step S63 to take another reading. This continues until a predetermined number, C_SAMP, of readings has been taken. Once C_SAMP samples have been taken and accumulated, the value in the accumulator (HW) is divided by C_SAMP (S68), to yield a hopper weight. In a preferred embodiment, the digital values L and R are integers ranging from zero to 16,383, the variance threshold V is 120, T1 is 100 ms and C_SAMP=40.

If the absolute value of the difference between L and R is greater than or equal to V, indicating too much variance between a sampled weight and a reference weight, the reference weight is adjusted by an increment VSTEP (S69). More specifically, R is adjusted so that the absolute value of the difference between L and R is reduced by VSTEP, i.e., if R is greater than L by more than V, R is reduced by VSTEP and if R is less than L by more than V, R is increased by VSTEP. In a preferred embodiment, VSTEP=10.

Following the adjustment of R, the loop counter (I) and the accumulator (HW) are zeroed (S70) and an unstable reading counter, U, is incremented. If the unstable reading counter U is not greater than a maximum UMAX, then CPU 106 reenters the main loop just before step S66. Otherwise, if U is greater than UMAX, U is reset to zero and an error count (ERRCNT) is incremented (S72). If the error count is greater than a maximum error value (ERRCNT>MAXERR), the hopper weight process ends and an error indication is returned. Otherwise, CPU 106 reenters the main loop just before step S66. In a preferred embodiment, UMAX=40 and MAXERR=4. Also, in a preferred embodiment, as instability is detected, the operator is provided with an indication, such as a display "UNST", to indicate that instability is being detected, thereby giving the operator the opportunity to eliminate the source of instability while a reading is being taken. Assuming a valid hopper weight reading is obtained, this can be used in the calibration process shown in FIG. 6.

Figure 8:
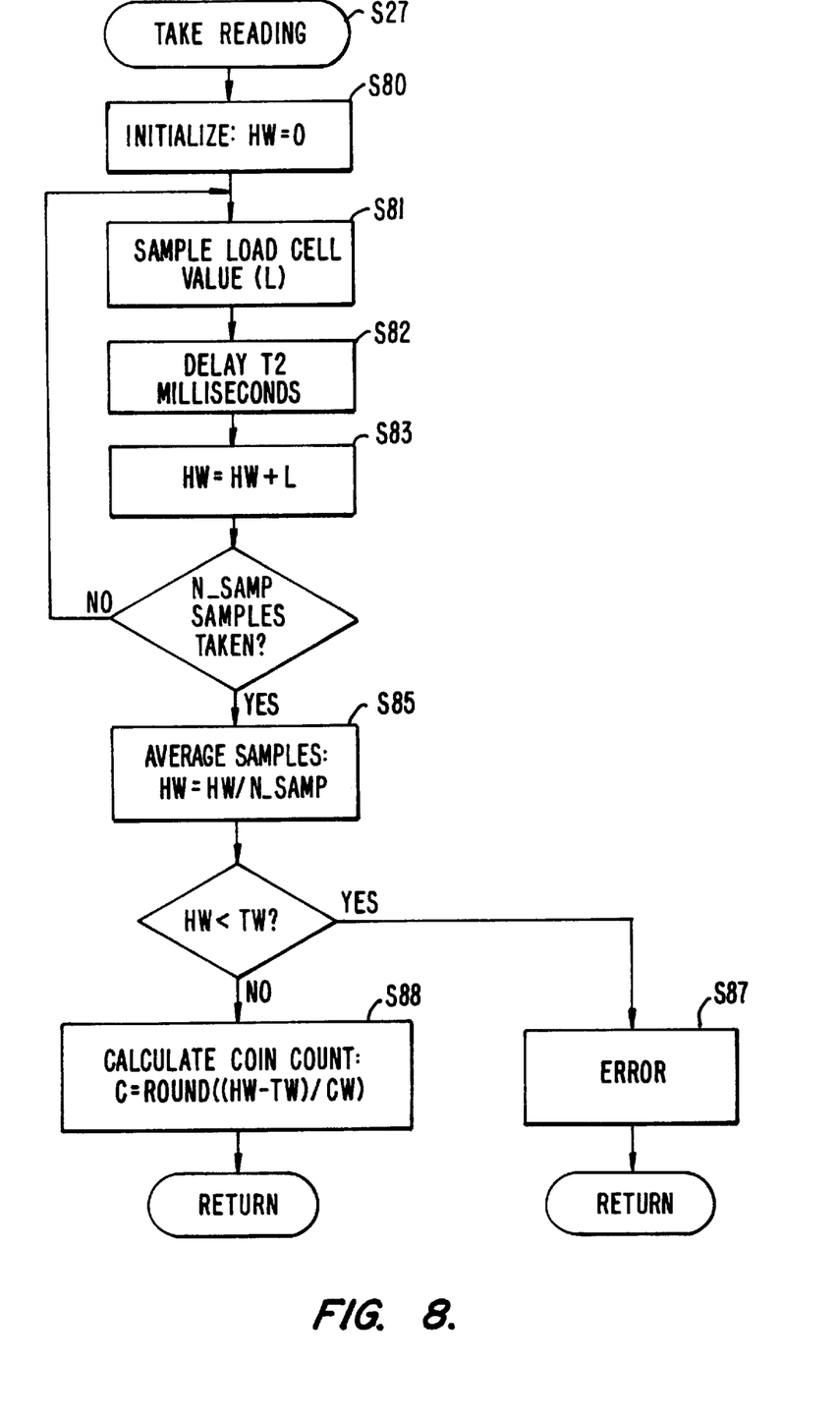
FIG. 8 is a flowchart of a process for obtaining an accurate coin count in the presence of noise and/or vibrations.

FIG. 8 shows the process of taking a reading, which results in either a coin count C being returned or an error indication being returned. At the outset of this process an accumulator (HW) and a loop counter (not shown) are initialized. In the main loop (shown as steps S81, S82, S83) a load cell is sampled to obtain a value L, CPU 106 delays for T2 ms, and the sampled value L is added to the accumulator (HW). This loop repeats until N_SAMP samples are taken. In a preferred embodiment, T2 is 200 ms and N_SAMP=30.

Once N_SAMP samples are taken, the accumulator (HW) is divided by N_SAMP (S85) and the resultant hopper weight (HW) is compared to the hopper tare weight (S86). If the hopper weight HW is less than the tare weight TW, an error signal is generated (S87), otherwise a coin count C is calculated according to the formula:

$$C=ROUND((HW-TW)/CW).$$

Of course, other suitable formulae can be used. The hopper weight reading process of FIG. 8 is less interactive and less error-correcting than the hopper-weight reading process of FIG. 3, since the former generally occurs when the slot machine is not open and an unreliable reading can be discarded without ill effects, whereas the latter process provides tare weight and per coin weights which cannot be as easily discarded.

Thus, in the manner described above, a hopper is weighed periodically and that weight is used, combined with an automatically determined per coin weight, to determine a number of coins in the hopper. In one specific use of the coin count, coins are counted just before a hopper door is opened and then counted again after the hopper door is closed and this difference is compared to an authorized difference to determine if unauthorized removal of coins from the hopper while the hopper door was open occurred. One application of this system includes a centralized slot machine control system, from where a trusted employee can monitor the opening and closing of each slot machine door, as well as a current inventory of the coins in the hopper and/or drop box of each slot machine. The necessary information can be communicated from the slot machines to the centralized slot machine control system through dedicated communication lines running from each slot machine or can be provided by the above described data pin system.

The above description is illustrative and not restrictive. Many variations of the invention will become apparent to those of skill in the art upon review of this disclosure. Merely by way of example, it should be apparent after reading the above description that noncoin disks or tokens, or even bills or scrip could be accounted for as coins are, and that the present invention could be used with other gaming machines or vending machines. It should also be apparent that the data pin system described above can be replaced with a hard-wired slot machine communications network connection, wireless links, optical or RF communications links, or the like. The scope of the invention should, therefore, be determined not with reference to the above description, but instead should be determined with reference to the appended claims along with their full scope of equivalents.

What is claimed is:

1. A gaming machine comprising:
   means for accepting coins inserted into the gaming machine;
   a coin container for receiving coins from the means for accepting coins;
   a strain gauge coupled to measure a combined weight of the coin container and the coins therein;
   digitizing means for converting an output of the strain gauge to a digital value representing the combined weight;
   calculating means for performing calculations including a subtraction of an empty coin container weight from the combined weight to arrive at a net weight and a division of the net weight from a unit coin weight to arrive at the number of coins in the coin container;
   means for compensating for temperature variations;
   means for detecting when the gaming machine is stable enough to allow an accurate measurement; and
   means for comparing the number of coins in the coin container to an expected coin count.

2. The apparatus of claim 1, wherein the coins are tokens exchangeable for value.

3. The apparatus of claim 1, wherein the threshold number of coins is one.

4. The apparatus of claim 1, wherein the coin container is a coin hopper.

5. The apparatus of claim 1, wherein the coin container is a drop box.

6. The apparatus of claim 1, further comprising means for detecting who has access to the coin container when the coin container is accessible.

7. The apparatus of claim 6, further comprising an electronic lock for securing the gaming machine, wherein access to the coin container requires an electronic key to open the electronic lock and the electronic key identifies the authorized user of the electronic key.

* * * * *